Aug. 1, 1967 R. J. SCHULTZ 3,334,293
FREQUENCY MULTIPLIER WITH MEANS FOR PROVIDING A PATH FOR
HARMONIC CURRENTS THROUGH A NON-LINEAR REACTANCE
Filed Sept. 16, 1963

INVENTOR.
ROBERT J. SCHULTZ
BY Mueller & Aichele
ATTYS.

United States Patent Office 3,334,293
Patented Aug. 1, 1967

3,334,293

FREQUENCY MULTIPLIER WITH MEANS FOR PROVIDING A PATH FOR HARMONIC CURRENTS THROUGH A NON-LINEAR REACTANCE

Robert J. Schultz, Aurora, Ill., assignor to Motorola, Inc., Franklin Park, Ill., a corporation of Illinois Filed Sept. 16, 1963, Ser. No. 309,027
3 Claims. (Cl. 321—69)

This invention relates to frequency multipliers using a non-linear reactance element for the generation of harmonic frequencies and in particular to the use of an untuned circuit to provide a path for circulation of idler harmonic currents through the non-linear reactance.

Any frequency multiplier circuit requires, for optimum efficiency, that the fundamental frequency be prevented from dissipating energy in the load resistance and that the output frequency be prevented from dissipating energy in the source resistance. In addition, to achieve maximum efficiency of operation in frequency multiplier circuits using a non-linear reactance to generate harmonics and which multiply by integers greater than two, it is necessary to provide idler frequency circuits which will allow harmonic frequencies other than the first or output harmonic frequencies to circulate through the non-linear reactance without unnecessarily dissipating energy in either the load or source resistance.

In the prior art it has been the practice to use idler circuits which will allow only particular harmonic frequencies to circulate through the non-linear reactance. Each idler harmonic frequency which is to circulate must be provided with a tuned circuit which will provide a low impedance path for that frequency and a high impedance path for other frequencies. The tuned circuits thus provided require at least two components and, in the case of high order idler harmonic frequencies, the circuits are difficult to construct and critical in adjustment.

Accordingly, it is an object of this invention to provide a simple and efficient frequency multiplier having a single circuit through which all idler harmonics can circulate.

A feature of this invention is the provision of a frequency multiplier structure including a single untuned circuit for circulation of all the idler frequency currents.

Another feature of this invention is the provision of a frequency multiplier circuit including a capacitor which is coupled across a non-linear reactance to provide a low impedance path for the circulation of harmonic frequency idler currents through the non-linear reactance. The capacitor may be variable to adjust the magnitude and phase of the harmonic currents for maximum efficiency.

The invention is illustrated in the drawings wherein.

In practicing this invention a frequency multiplier circuit is provided which includes a non-linear reactance, an input circuit tuned to the frequency to be applied, and an output circuit tuned to the multiplier output frequency. A variable capacitor is coupled across the non-linear reactance, which may be a varactor diode, to provide a low impedance circuit for idler harmonic frequencies to circulate through the varactor diode. The provision of a capacitor as a low impedance path for harmonic frequency idler currents enables the frequency multiplier to achieve high efficiency with a minimum number of components.

Figure 1:
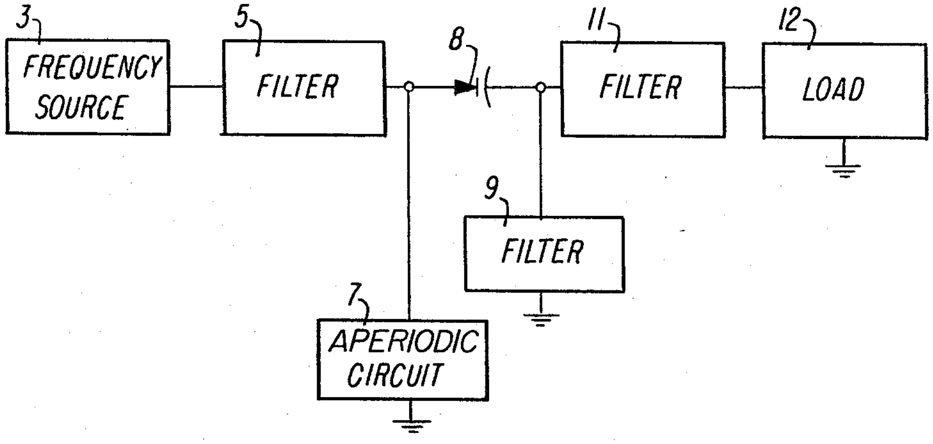
FIG. 1 is a block diagram of the invention.

In FIG. 1 there is shown a block diagram of a frequency multiplier incorporating the features of this invention. A source of alternating current 3 is coupled to a varactor diode 8 by filter 5 which attenuates all harmonics of the fundamental frequency except the fundamental itself. The varactor diode 8 is coupled to load 12 by filter 11 which attenuates all frequencies lower than the output harmonic. Filters 5 and 11 also provide means for matching the load and source to the frequency multiplier circuit. Filter 9 is a band rejection filter designed to attenuate output harmonics and higher frequencies. Idler circuit 7 is untuned, that is, circuit 7 is aperiodic between and including the first harmonic frequency and the output harmonic frequency, and provides a low impedance path for the circulation of harmonics generated by the varactor diode 8.

In operation the fundamental frequency currents flow from the source 3 through filter 5, the varactor diode 8, filter 9 and return to the source 3. The harmonic frequencies generated by the varactor diode 8, other than the output harmonic, circulate from the non-linear reactance 8 through filter 9, idler circuit 7 and return to the varactor diode. The output harmonic frequency currents generated by the varactor diode circulate through filter 11, load 12, and return to the varactor diode 8 through idler circuit 7.

Figure 2:
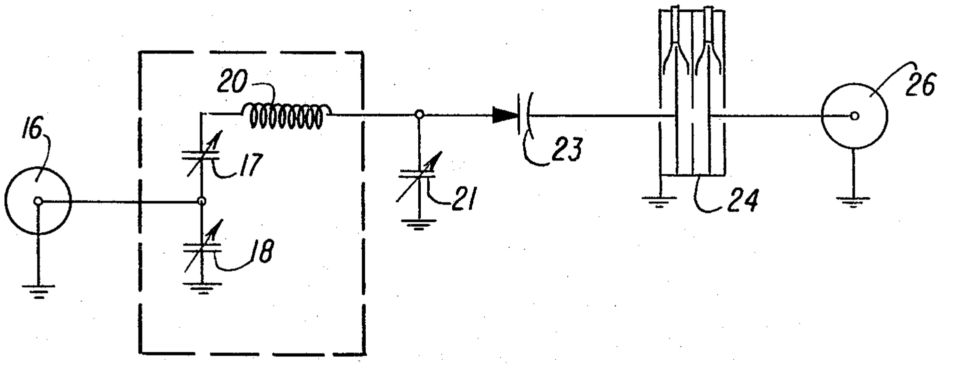
FIG. 2 is a schematic diagram of the system shown in FIG. 1.

A schematic diagram of a circuit incorporating the features of FIG. 1 is shown in FIG. 2. The input frequency which is to be multiplied is applied to the frequency multiplier circuit through connector 16. The input filter 5 of FIG. 1 consists of variable capacitors 17 and 18 and inductor 20 tuned to resonance at the fundamental frequency. Varactor diode 23 is coupled to ground at the fundamental and idler frequencies through tuner 24. Tuner 24 can be of the type described in Patent No. 2,833,994 of C. P. Pipes et al. and acts as a bandpass filter coupling the output harmonic generated in varactor diode 23 to the load and as a band rejection filter providing a low impedance path to ground for harmonics lower than the output harmonic. Thus the tuner 24 combines the functions of filter 11 and band reject filter 9 of FIG. 1.

Variable capacitor 21 is coupled from the input of the varactor diode 23 to ground and provides a low impedance path for the idler harmonic frequencies generated in varactor diode 23 to circulate. The idler harmonic frequencies generated in varactor diode 23 circulate through the output tuner 24 to ground through capacitor 21 and return to the varactor diode 23. The circuit including variable capacitor 21 is adjusted for maximum output efficiency and is not resonant at any idler harmonic frequency. Thus capacitor 21 is aperiodic between and including the first harmonic frequency and the output harmonic frequency.

A frequency multiplier circuit has been provided in which the critical tuned paths for idler harmonic frequency currents have been replaced by a variable capacitor. The circuit thus shown is simple in construction and easy to adjust.

What is claimed is:

1. A frequency multiplier system for receiving an alternating current signal of a fundamental frequency and multiplying the same an integral number of times to form an output frequency signal, said system including in combination, a non-linear reactance device, an input circuit coupling said non-linear reactance device to means providing the alternating current signal, said input circuit being constructed to attenuate harmonics of the fundamental frequency greater than the first harmonic, output means coupling said reactance device to a load and forming an output filter constructed to attenuate harmonics lower than the desired output harmonic frequency, and circuit means aperiodic between and including said first harmonic frequency and said output harmonic frequency, said circuit means being directly connected across said reactance device to provide a low impedance path for harmonic frequency currents between said first harmonic frequency and said output harmonic frequency.

2. A frequency multiplier system for receiving an alternating current signal of a fundamental frequency and multiplying the same an integral number of times to form an output frequency signal, said system including in combination, a varactor diode, an input circuit coupling said varactor diode to means providing the alternating current signal, said input circuit being constructed to attenuate harmonics of the fundamental frequency greater than the first harmonic, output means coupling said varactor diode to a load and forming an output filter constructed to attenuate harmonics lower than the desired output harmonic frequency, idler circuit means including only a capacitor and aperiodic between and including said first harmonic frequency and said output harmonic frequency, said capacitor being connected directly across said varactor diode to provide a low impedance path for harmonic frequency currents between said first harmonic frequency and said output harmonic frequency.

3. A frequency multiplier system for receiving an alternating current signal of a fundamental frequency and multiplying the same an integral number of times to form an output frequency signal, said system including in combination, a varactor diode, an input circuit coupling said varactor diode to means providing the alternating current signal, said input circuit being constructed to attenuate harmonics of the fundamental frequency greater than the first harmonic, output means coupling said varactor diode to a load and forming an output filter constructed to attenuate harmonics lower than the desired output harmonic frequency, idler circuit means including only a variable capacitor and aperiodic between and including said first harmonic frequency and said output harmonic frequency, said variable capacitor being connected directly across said varactor diode to provide a low impedance path for harmonic frequency currents between said first harmonic frequency and said output harmonic frequency.

References Cited

UNITED STATES PATENTS

| | | | |
|---|---|---|---|
| 2,970,275 | 1/1961 | Kurzrok | 330—5 |
| 3,025,448 | 3/1962 | Muchmore | 321—69 |
| 3,085,205 | 4/1963 | Sante | 328—16 |
| 3,165,690 | 1/1965 | Kaufman | 321—69 |
| 3,196,339 | 7/1965 | Walker et al. | 321—69 |

OTHER REFERENCES

Frequency Changers by I. Gottlieb; Pub. 1965, First Edition; pp. 83–86.

JOHN F. COUCH, *Primary Examiner.*

G. GOLDBERG, *Assistant Examiner.*